United States Patent
Oshima et al.

(10) Patent No.: US 10,859,726 B2
(45) Date of Patent: Dec. 8, 2020

(54) MULTI-MODE ACOUSTIC TOOL AND METHOD

(71) Applicant: Schlumberger Technology Corporation, Sugar Land, TX (US)

(72) Inventors: Atsushi Oshima, Tokyo (JP); Nicholas Andrew Robinson, Tokyo (JP); Naoki Sakiyama, Tokyo (JP); Hiroshi Nakajima, Kanagawa-ken (JP); Hiroaki Yamamoto, Kanagawa-Ken (JP); Takeshi Endo, Kanagawa-ken (JP); Henri-Pierre Valero, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 56 days.

(21) Appl. No.: 15/555,147

(22) PCT Filed: Mar. 3, 2016

(86) PCT No.: PCT/US2016/020533
§ 371 (c)(1),
(2) Date: Sep. 1, 2017

(87) PCT Pub. No.: WO2016/141110
PCT Pub. Date: Sep. 9, 2016

(65) Prior Publication Data
US 2018/0045844 A1  Feb. 15, 2018

Related U.S. Application Data (60) Provisional application No. 62/127,714, filed on Mar. 3, 2015.

(51) Int. Cl.
*G01V 1/52* (2006.01)
*G01V 1/40* (2006.01)
(Continued)

(52) U.S. Cl.
CPC .............. *G01V 1/52* (2013.01); *G01V 1/40* (2013.01); *G01V 1/44* (2013.01); *G01V 1/46* (2013.01); *G01V 1/50* (2013.01)

(58) Field of Classification Search
CPC ... G01V 1/40; G01V 1/44; G01V 1/46; G01V 1/50; E21B 47/0005
(Continued)

(56) References Cited

U.S. PATENT DOCUMENTS 3,724,589 A * 4/1973 Chapman, III .......... G01V 1/44
367/27
5,753,812 A * 5/1998 Aron ..................... E21B 47/011
181/102
(Continued)

OTHER PUBLICATIONS

International Search Report and Written Opinion issued in International Patent Application PCT/US2016/020533 dated Jun. 16, 2016. 15 pages.
(Continued)

*Primary Examiner* — Ian J Lobo (57) ABSTRACT

A downhole acoustic tool and method of use are provided. The acoustic tool includes an acoustic tool body. In addition, a transmitter section located along the acoustic tool body, including four or more transmitters to be driven so as to excite multi-mode waveforms. The acoustic tool further includes an array receiver section located along the acoustic tool body, containing a receiver sub-section comprising four or more receivers axially aligned with the four or more transmitters and spaced axially apart from the transmitter section. The acoustic tool also includes a processor configured to drive the transmitter section to excite multi-mode waveforms and to extract the multi-mode waveforms detected by the receiver section for interpretation of formation properties. A method for measuring a formation using the described acoustic tool is also provided.

22 Claims, 4 Drawing Sheets

(51) Int. Cl.
*G01V 1/44* (2006.01)
*G01V 1/46* (2006.01)
*G01V 1/50* (2006.01)

(58) Field of Classification Search
USPC .............................. 367/25, 35; 181/102, 105
See application file for complete search history.

(56) References Cited

U.S. PATENT DOCUMENTS

| | | | | |
|---|---|---|---|---|
| 5,831,934 | A * | 11/1998 | Gill ........................ | G01V 1/48 367/25 |
| 6,213,250 | B1 * | 4/2001 | Wisniewski ............. | G01V 1/52 181/104 |
| 6,359,438 | B1 * | 3/2002 | Bittar ...................... | G01V 3/28 324/369 |
| 6,366,531 | B1 | 4/2002 | Varsamis et al. | |
| 2005/0000688 | A1 | 1/2005 | Hsu et al. | |
| 2005/0067191 | A1 | 3/2005 | Miyamoto et al. | |
| 2006/0106542 | A1 | 5/2006 | Haugland | |
| 2006/0198242 | A1 | 9/2006 | Geerits et al. | |
| 2006/0233048 | A1 * | 10/2006 | Froelich .............. | E21B 47/0005 367/35 |
| 2009/0109794 | A1 * | 4/2009 | Sinha .................... | E21B 49/006 367/35 |
| 2010/0202252 | A1 * | 8/2010 | Ounadjela ............. | B06B 1/0607 367/31 |
| 2011/0280101 | A1 | 11/2011 | Wang | |
| 2014/0024111 | A1 | 1/2014 | Kannan et al. | |

OTHER PUBLICATIONS

Alford, R. M., Shear Data in the Presence of Azimuthal Anisotropy: Dilley, Texas. Expanded Abstracts, 56th SEG Annual International Meeting and Exposition, Houston, Texas, USA, Nov. 2-6, 1986, Paper S9.6. 4 pages.

* cited by examiner

MULTI-MODE ACOUSTIC TOOL AND METHOD

RELATED APPLICATIONS

This application claims the benefit of a related U.S. Provisional Application Ser. No. 62/127,714, filed Mar. 3, 2015, entitled "MULTI-MODE ACOUSTIC TOOL AND METHOD," to Atsushi OSHIMA et al., the disclosure of which is incorporated by reference herein in its entirety.

BACKGROUND

The following descriptions and examples are not admitted to be prior art by virtue of their inclusion in this section.

Various downhole devices are used to investigate properties and structures in an oil field. In some cases, non-destructive tools such as acoustic tools are used to image the area of a borehole and the formation extending around the borehole. Oftentimes, the acoustic tools are conveyed along with a drill string in either Logging While Drilling (LWD) or Measuring While Drilling (MWD) modes. In other cases, acoustic tools may be conveyed by a coil tubing or suspended from a wireline.

Acoustic tools comprise different configurations based on frequency divisions. For sonic tools at the lower end of the acoustic frequency range, there is a further division regarding the mode of excitation for the signals. In a sonic tool there may be mono-pole, uni-pole, di-pole, quadra-pole and hexapole excitation modes. Typically a tool is designed and configured to optimize the transmission and receipt of a single mode of excitation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with one embodiment, a downhole acoustic tool is provided, comprising an acoustic tool body. In addition, the acoustic tool includes a transmitter section located along the acoustic tool body, the transmitter section including four or more transmitters to be driven so as to excite multi-mode waveforms. The acoustic tool further includes an array receiver section located along the acoustic tool body, the receiver section including a receiver sub-section comprising four or more receivers axially aligned with the four or more transmitters and spaced axially apart from the transmitter section. Further, the acoustic tool includes a processor configured to drive the transmitter section to excite multi-mode waveforms and to extract the multi-mode waveforms detected by the receiver section for interpretation of formation properties.

In accordance with another embodiment, a method for measuring a formation using a downhole acoustic tool is provided. The method includes providing the acoustic tool with a transmitter section comprising four or more transmitters and providing the acoustic tool with a receiver section comprising a receiver sub-section comprising four or more corresponding receivers axially aligned with the four or more transmitters and space axially apart from the transmitter section. The method further includes exciting the transmitter section so as to excite multi-mode waveforms and detecting acoustic signals for decomposing into multi-mode waveforms by the receiver section. In addition, the method includes processing the multi-mode waveforms obtained by the receiver section for interpreting formation characteristics.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments.

The words "including" and "having" shall have the same meaning as the word "comprising."

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures.

The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

In accordance with an embodiment of the present disclosure, one of aspect provides a method and an apparatus to excite sonic transmitters and receive signals in multiple modes with or without controlling transmitter excitation timing for controlling the transmitter firing directions to the characteristic direction of formations (e.g. fast/slow shear slowness azimuth of transversely isotropic formations in horizontal well) for oil field acoustic logging tool and downhole tool.

Figure 1:
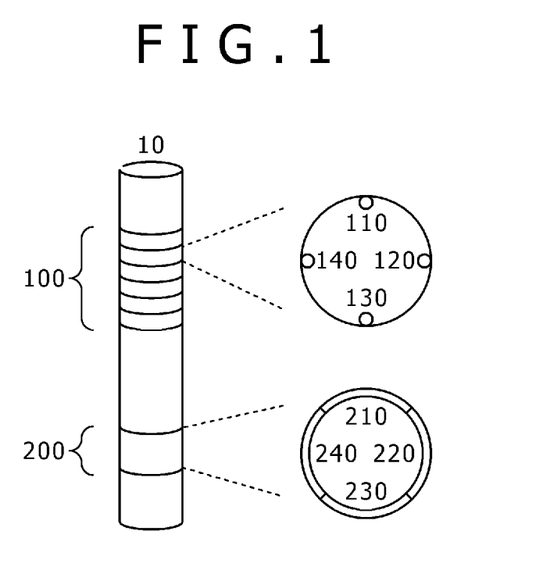
FIG. 1 is a schematic of a downhole multi-mode acoustic tool, according to an embodiment of the disclosure.

Referring generally to FIG. 1, a downhole acoustic tool 10 is shown having a receiver array section 100 and a transmitter section 200. The downhole acoustic tool 10 may be conveyed in a drill string, wireline, coil tubing, or other appropriate mechanisms for conveyance. Both the receiver array section 100 and the transmitter section 200 are sectioned in quadrants for this embodiment. The four quadrants are aligned with one another along the length of the acoustic tool 10. Stated in another way, FIG. 1 is an exemplary embodiment of the present disclosure which includes a downhole acoustic tool, four quadrant transmitters, and receiver arrays with four azimuth channels (90 degree apart) for each sub-section or station.

In the receiver array section 100 there are one or more sub-sections each containing four receivers, 110, 120, 130, 140, oriented orthogonal to one another. There may be a number of sub-sections of four receivers 110-140, located along the length of the downhole acoustic tool 10. All of the receivers 110-140 for each of the sub-sections are aligned with one another along the length of the downhole acoustic tool 10. As stated earlier, the four quadrants or azimuth channels of the receiver array section 100 are aligned with the four quadrants of the transmitter section 200.

Having four receivers 110-140 positioned orthogonally to one another allows for the receipt of various modes of excitation by the individual receivers. The mode extraction after signal detection can be determined as follows. For monopole, the mode extraction is receiver 110+receiver 120+receiver 130+receiver 140. There are four separate dipole extraction modes. For the first dipole, the mode extraction is receiver 110+receiver 120−receiver 130−receiver 140. The second dipole has a mode extraction of receiver 110−receiver 120−receiver 130+receiver 140. The third dipole mode extraction is receiver 110−receiver 130. And the fourth dipole mode extraction is receiver 120−receiver 140. In addition to monopole and dipole, the receiver array section 100 can function as a quadrupole receiver. The mode extraction for quadrupole receivers is receiver 110−receiver 120+receiver 130−receiver 140. Finally, the receiver array section 100 can operate in unipole mode. For unipole mode, the mode extraction is receiver 110, receiver 120, receiver 130, or receiver 140.

In the transmitter section 200 there are one or more sub-sections each containing four transmitters, 210, 220, 230, 240, oriented orthogonal to one another. All of the transmitters 210-240 for each of the sub-sections are aligned with one another along the length of the downhole acoustic tool 10. Transmitter 210 is aligned with receiver 110, transmitter 220 is aligned with receiver 120, transmitter 230 is aligned with receiver 130, and transmitter 240 is aligned with receiver 140.

Having four transmitters 210-240 positioned orthogonally to one another allows for the excitation of various frequency modes by the transmitters. The mode excitation can be determined as follows. For monopole, the mode excitation is provided by transmitter 210+transmitter 220+transmitter 230+transmitter 240. There are four separate dipole excitation modes. For the first dipole, the mode excitation is transmitter 210+transmitter 220−transmitter 230−transmitter 240. The second dipole has a mode excitation of transmitter 210−transmitter 220−transmitter 230+transmitter 240. The third dipole mode excitation is transmitter 210−transmitter 230. And the fourth dipole mode excitation is transmitter 220−transmitter 240. In addition to monopole and dipole, the transmitter section 200 can function as a quadrupole transmitter. The mode excitation for quadrupole transmitters is transmitter 210−transmitter 220+transmitter 230−transmitter 240. Finally, the transmitter section 200 can operate in unipole mode. For unipole mode, the mode excitation is transmitter 210, transmitter 220, transmitter 230, or transmitter 240.

Each quadrant transmitter 210-240 can be excited by either positive or negative power (or polarity) to generate acoustic signals in desired modes such as monopole, dipole, quadrupole, and other higher order modes such as hexapole. Unipole firing can be also performed using one of transmitters.

Each azimuth receiver 110-140 detects signals and digitized waveform data are decomposed into multiple modes for interpretation of a formation acoustic characteristic. A magnetometer and/or an accelerometer sensor can correlate such waveform data with the tool orientation. Alternatively, a magnetometer and/or an accelerometer sensor can be used so that the timing of a downhole acoustic transmitter firing can be controlled to occur at a desired orientation in the borehole especially while the Logging While Drilling (LWD) tool is rotating.

In this case, the transmitter can be made to fire at a desired azimuthal orientation in order to obtain multiple waveforms at the same depth or to control the azimuthal resolution sampling expected. Combining these waveforms together improves robustness to downhole drilling noise while obtaining an acoustic slowness measurement that is azimuthally oriented and azimuthally sampled as per user request.

With this embodiment, a single sub-set of the transmitter section 200 can excite multiple modes and the receiver arrays 110-140 of receiver array section 100 extracts multiple modes. This method has many applications for oil field acoustic logging tools such as extracting formation dipole mode data to measure shear slowness, anisotropy, etc.

The extracting modes for anisotropy measurements are not limited to the dipole mode, but other higher order modes, such as a hexapole mode, can also be measured for interpretation of formation anisotropies.

Figure 2A:
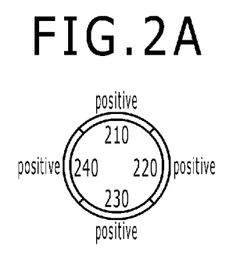
FIG. 2A is a cross-sectional schematic of a transmitter section showing monopole mode excitation, according to an embodiment of the disclosure.

Turning now to FIG. 2, FIGS. 2A-2G reflect some of the different configurations and the different excitation modes available with embodiments of this disclosure. The transmitter sections 200 four transmitters 210-240, can be fired using either positive or negative polarity. This accounts for the positive and negative labeling to the outside of the cross-section of the transmitter section 200 shown. FIG. 2A represents a monopole mode excitation. All four transmitters 210-240 are positively powered together to produce a monopole mode excitation. Alternatively, all four transmitters 210-240 may also be negatively powered.

Figure 2B:
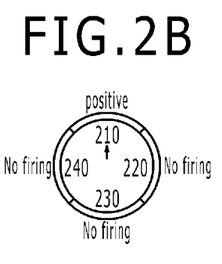
FIG. 2B is a cross-sectional schematic of a transmitter section showing unipole mode excitation, according to an embodiment of the disclosure.

Unipole mode excitation is shown in example FIG. 2B. In unipole mode excitation, only one transmitter is fired, in this illustrative example, transmitter 210 is shown as the firing transmitter while the other transmitters 220-240 are shown as not firing. The unipole mode excitation is produced in the +90 orientation as shown by the arrow in the figure. Of course, any of the four transmitters 210-240 can be used to produce a unipole mode in the corresponding direction of the firing transmitter.

Figure 2C:
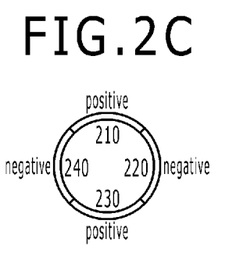
FIG. 2C is a cross-sectional schematic of a transmitter section showing quadrupole mode excitation, according to an embodiment of the disclosure.

Referring generally to FIG. 2C, this configuration shows a quadrupole mode excitation. In quadrupole mode excitation, transmitters 210 and 230 are positively powered while orthogonal transmitters 220 and 240 are negatively powered. As with the previous example, other configurations in which one set of transmitters is positive and an orthogonal set of transmitters is negative can also be used to produce a quadrupole mode excitation.

Figure 2D:
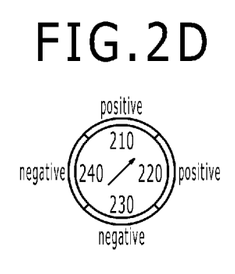
FIG. 2D is a cross-sectional schematic of a transmitter section showing a first dipole mode excitation at a +45 degree angle, according to an embodiment of the disclosure.
Figure 2E:
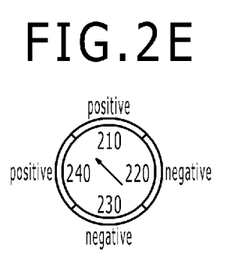
FIG. 2E is a cross-sectional schematic of a transmitter section showing a second dipole mode excitation at a −45 degree angle, according to an embodiment of the disclosure.
Figure 2F:
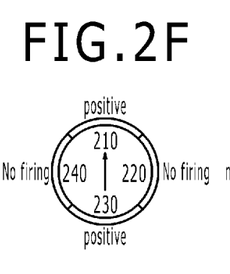
FIG. 2F is a cross-sectional schematic of a transmitter section showing a third dipole mode excitation at a 0 degree angle, according to an embodiment of the disclosure.
Figure 2G:
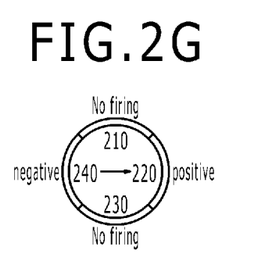
FIG. 2G is a cross-sectional schematic of a transmitter section showing a fourth dipole mode excitation at a +90 degree angle, according to an embodiment of the disclosure.

The remaining illustrative figures FIG. 2D-2G all feature dipole mode excitation configurations. These figures show general configurations for dipole mode excitation and other embodiments are not limited to only these specific transmitters. In FIG. 2D, transmitters 210 and 220 are positively powered while transmitters 230 and 240 are negatively powered. In this specific case, the dipole mode excitation will be in the +45 degree orientation. For FIG. 2E, transmitters 210 and 240 are positively powered while transmitters 220 and 230 are negatively powered. This results in a dipole mode excitation in the −45 orientation. FIG. 2F has transmitter 210 positively powered and opposite transmitter 230 negatively powered. Transmitters 220 and 240 do not fire. The resulting dipole mode excitation is in the +90 orientation as shown by the arrow. Finally, FIG. 2G has transmitter 220 positively charged and opposite transmitter 240 negatively charged. Transmitters 210 and 230 are not firing. The resulting dipole mode excitation is produced at 0 degrees and is shown by the arrow.

FIGS. 2A-2G illustrate some examples of transmitter excitation modes according to embodiments of the present disclosure. The receivers 110-140 aligned with each quadrant transmitter 210-240, can detect acoustic signals, and by decomposing the waveform a particular waveform mode can be extracted to process and interpret the formation acoustic properties.

In many previous designs the transmitter section implementation is only dedicated and optimized for a single mode such as monopole only, dipole only, etc. For example, in the case of crossed dipole measurements, only two individual transmitters need to be implemented. Embodiments of the current disclosure provide efficient source configurations for multi-mode excitations by only using a single set of sources (i.e., transmitters 210-240).

In some embodiments of the downhole acoustic tool system disclosed herein, a hardware platform is provided on which control and processing software is operated. The downhole acoustic tool system may be housed in a metal drill collar allowing it to be placed in drilling assemblies suitable for use in the oil and gas industry. Depending upon application requirements, a dual axis magnetometer system may be used to measure the orientation of the downhole acoustic tool relative to the earth's magnetic field. Using the data output from those magnetometers, the downhole acoustic tool system may be able to understand the position of a reference point on the collar relative either to true north, when borehole deviation is near vertical, or top of the hole in the case of a deviated borehole.

Orientation is enabled in other references, such as co-owned US Patent Application Publication no.: US 2014/024111 A1, Acoustic Borehole Imaging Tool, the contents of which are incorporated herein in their entirety. In the application, the application of azimuthal angle information is provided for a LWD sonic tool. Similar aspects of the azimuthal angle information and system may be used in embodiments of the current disclosure.

Figure 3A:
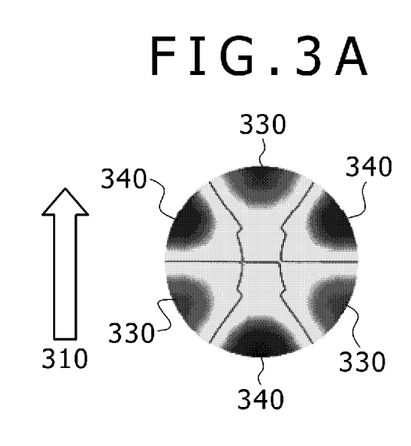
FIGS. 3A and 3B show two hexapole mode firings, 3A is Y-Hexapole and 3B is X-Hexapole, according to an embodiment of the disclosure.
Figure 3B:
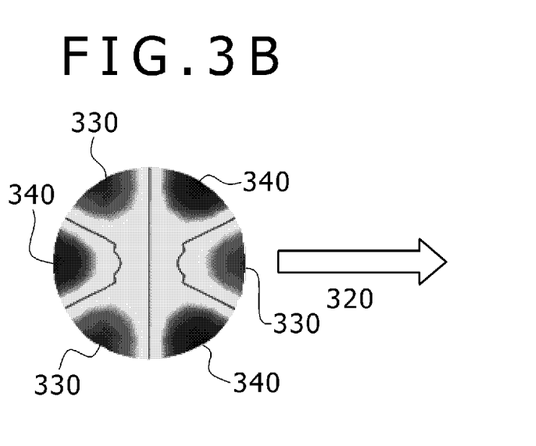

Higher order azimuthal modes measured with an LWD dipole sonic accoustic tool are used for deriving elastic properties of a formation and for quality control of the dipole measurements. In addition to well known uses of dipole modes for measuring formation anisotropy, hexapole mode is one of examples for such higher order azimuthal modes. Hexapole mode shares the same antisymmetric plane as dipole mode. As shown in FIGS. 3A and 3B, two orthogonal hexapole modes may be measured with two orthogonal dipole mode firings. For hexapole firing, the transmitters are placed in groups of three. Two groups, hexapole group 330 and hexapole group 340 are shown. One of the groups is positively powered while the other group is negatively powered.

In FIG. 3A, six transmitters are shown. The top transmitter 330 and the two transmitters 330 immediately below the horizontal line may be positively powered, and the transmitter 340 opposite to the top and the two transmitters 340 immediately above the horizontal line may be negatively powered. The resulting hexapole mode excitement is in the Y-direction to the top of the figure as shown by the left most arrow 310. The resulting dipole firing direction is a y-dipole mode excitation at +90 degrees.

FIG. 3B has the transmitter 330 on the right positively powered and the two transmitters 330 to the left of the vertical line also positively powered. The transmitter 340 on the left and the two transmitters 340 immediately to the right of the vertical line may be negatively powered. The resulting hexapole mode excitation is to the right of the figure as shown by the right most arrow 320. The resulting dipole firing direction is an x-dipole mode excitation at 0 degrees.

Similarly to an LWD quadrupole sonic, elastic properties of formations may be derived with the dipole and the hexapole mode. The properties derived with dipole and hexapole mode include anisotropy information of formation in TTI (Tilted Transverse Isotropy) or TIV (Transverse isotropy of vertical axis of symmetry) in a horizontal well. The two plots shown in FIGS. 4 and 5 represent modeling results with TIV formations (fast shear slowness is 256 μs/ft and slow shear slowness is 292 µs/ft in an 8.5-in horizontal borehole without the tool presence).

Figure 4:
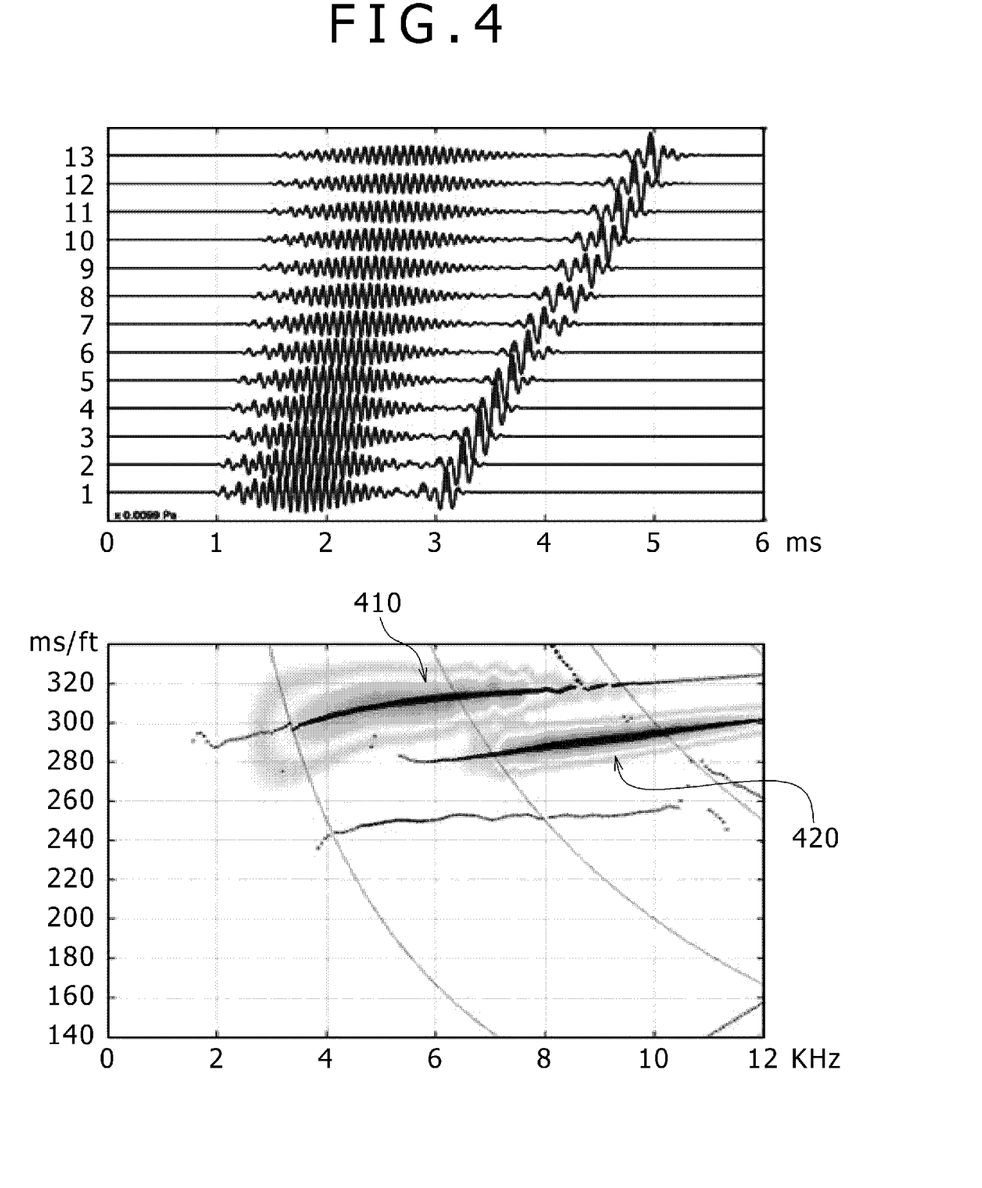
FIG. 4 shows a graph containing the traces of 13 receivers in a Y-Dipole/Hexapole orientation for firing and the resulting image graph of the formation, according to an embodiment of the disclosure.

In FIG. 4, dipole and hexapole results for a Y orientation (such as in FIG. 3A) are shown. The top graph displays the waveform traces received by a receiver array comprising 13 receivers. The distance along the tool body accounts for the delay in receipt of the waveform from receiver 1 to receiver 13. The image below shows the resulting dipole 410 and hexapole 420 response.

Figure 5:
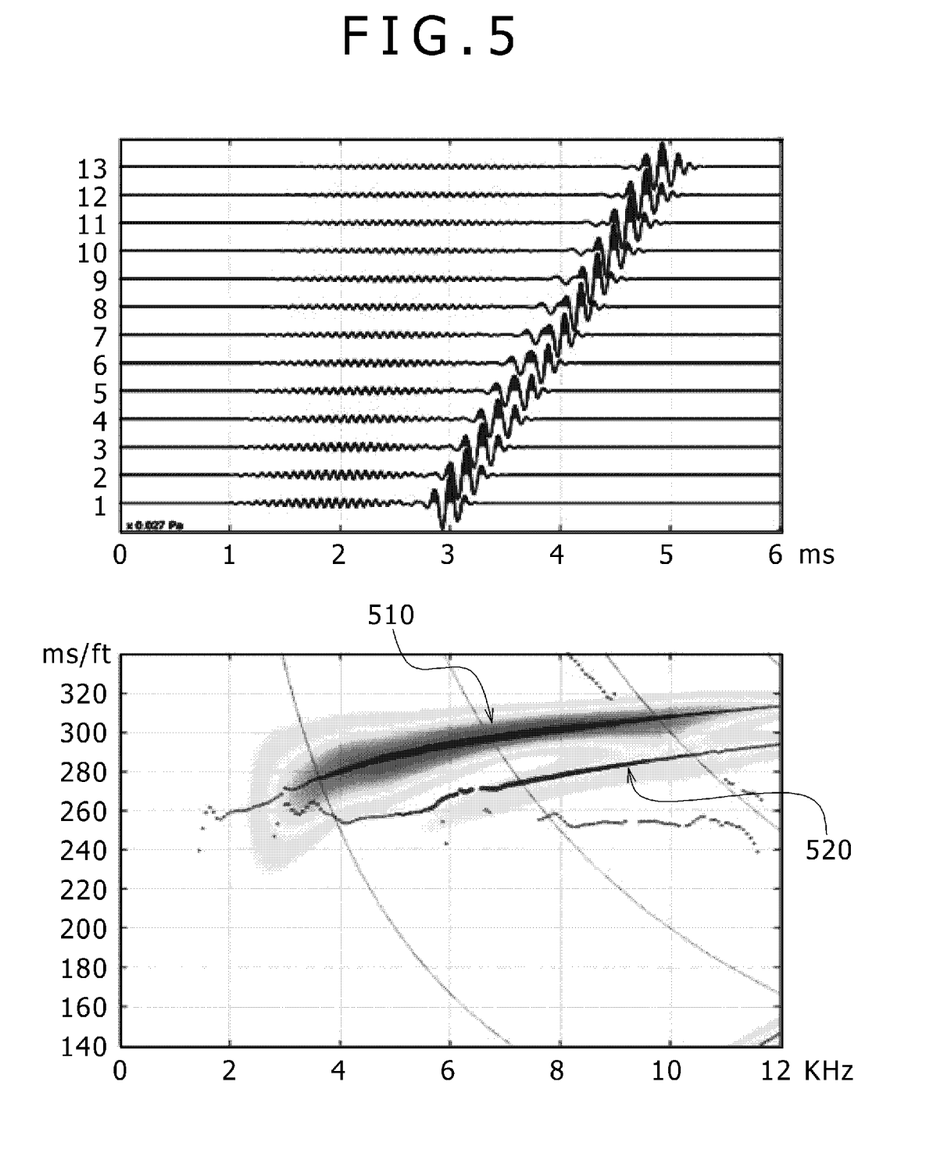
FIG. 5 shows a graph containing the traces of 13 receivers in an X-Dipole/Hexapole orientation for firing and the resulting image graph of the formation, according to an embodiment of the disclosure.

In FIG. 5, dipole and hexapole results for an X orientation (such as in FIG. 3B) are shown. The top graph displays the waveform traces received by a receiver array comprising 13 receivers. The distance along the tool body accounts for the delay in receipt of the waveform from receiver 1 to receiver 13. The image below shows the resulting dipole 510 and hexapole 520 response.

Depending on the orientation of the dipole and the hexapole mode propagation, dispersions of the borehole hexapole modes are different. When the borehole dipole mode is available, the hexapole processing results may be one of ways to conduct quality control of the dipole processing results. Co-owned US Application Publication Serial No.: US 2006/0198242 A1, Acoustic Logging-While-Drilling Tools Having a Hexapole Source Configuration and Associated Logging Methods, the contents of which are incorporated herein by reference, describes the application of hexapole sonic measurements downhole.

In addition to the hexapole mode excitation which shares the same antisymmetric plane as dipole mode excitation, monopole and/or quadrupole modes may also be used for extracting the information about the anisotropy intensity of formations. Monopole and quadrupole components may be excited by dipole firings, when a LWD dipole downhole acoustic tool is run in a well through a TI (Transverse Isotropic) formation when the TI symmetry axis is not orthogonal to the borehole axis. As similar phenomena does not occur when the symmetry axis of a TI formation and a borehole axis are orthogonal to one another (for example, TIV case in a horizontal well), energy levels of monopole and/or quadrupole modes may be an indicator of formation anisotropies.

Dipole measurements with an LWD sonic tool may be applied also to the cased hole measurements. After cementing the casing, bonding quality between the casing and the cement (and/or bonding between the cement and the formations) may be evaluated azimuthally with the dipole measurements. The near wellbore damage after casing installation may also be evaluated with the dipole measurements. After fracturing the well, development of fracturing may be evaluated with the dipole acquisition. All of the applications covered with the LWD dipole sonic are not limited to open hole measurements, but can also be applied to cased hole measurements.

Processing of such data recorded with dipole or hexapole can be processed with a similar approach as Alford Rotation (refer to "Shear Data in the Presence of Azimuthal Anisotropy: Dilley, Tex.," Expanded Abstracts, 56th SEG Annual International Meeting and Exposition, Houston, Tex., USA, Nov. 2-6, 1986, Paper S9.6, which is incorporated herein by reference) so to detect the slow and fast shear slownesses in the borehole. In such a case, 2 and 4 components processing can be used using similar acquisition scheme as usual wireline tool or Drilling and Measurement dipole logging tool.

Such processing could therefore be used to detect anisotropic formation properties as well as detecting defect around the borehole. For example, it will be possible to detect alteration around the borehole or fractures. Such information can be extracted from open and cased data. Note finally that this processing can be also used to detect information about cement properties and will therefore help quantify well integrity. In this document we refer to Alford Rotation processing but any processing providing both direction of dipole or hexapole splitting could be used as well to extract information mentioned above.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A downhole acoustic tool, comprising:
   an acoustic tool body;
   a transmitter section located along the acoustic tool body, the transmitter section including a transmitter sub-section, the transmitter sub-section including four or more transmitters respectively positioned at a common axial plane of the acoustic tool body, respective ones of the four or more transmitters being selectively electrically drivable so as to excite multi-mode waveforms, the transmitter sub-section being selectively operable in multiple excitation modes including a unipole mode, a monopole mode, a dipole mode, and a quadrupole mode;
   a receiver section located along the acoustic tool body, the receiver section including a receiver sub-section spaced axially apart from the transmitter sub-section, the receiver sub-section including four or more receivers axially aligned with the four or more transmitters; and
   a processor configured to:
      selectively operate the transmitter sub-section in the multiple excitation modes by selectively electrically driving respective ones of the four or more transmitters of the transmitter sub-section to excite the multi-mode waveforms; and
      extract the multi-mode waveforms detected by the receiver sub-section for interpretation of formation properties.

2. The downhole acoustic tool of claim 1, wherein the four or more transmitters are configured to excite a higher order azimuthal mode waveform.

3. The downhole acoustic tool of claim 1, wherein the formation properties include at least one of anisotropy or shear slowness.

4. The downhole acoustic tool of claim 1, wherein the four or more transmitters are four quadrant transmitters, and the four or more receivers are four corresponding azimuthal channels.

5. The downhole acoustic tool of claim 1, wherein the four or more transmitters are controlled to fire at a desired azimuthal orientation in a borehole.

6. The downhole acoustic tool of claim 1, wherein the processor is further configured to correlate waveform data derived from the multi-mode waveforms with an orientation of the tool.

7. The downhole acoustic tool of claim 1, wherein the four or more transmitters are six transmitters, and the four or more receivers are six receivers.

8. The downhole acoustic tool of claim 7, wherein respective ones of the six transmitters are selectively electrically drivable to excite hexapole waveforms.

9. The downhole acoustic tool of claim 1, wherein the receiver section further includes an additional receiver sub-section spaced axially apart from the transmitter sub-section, the additional receiver sub-section including an additional four or more receivers axially aligned with the four or more transmitters.

10. The downhole acoustic tool of claim 1, wherein respective ones of the four or more transmitters are configured to be selectively electrically driven by a selectable one of positive or negative power.

11. The downhole acoustic tool of claim 1, wherein the tool is configured to implement a cased hole measurement for evaluating a cement bonding quality.

12. The downhole acoustic tool of claim 1, wherein the dipole mode includes a first dipole mode excitation configuration having a positive forty-five degree orientation, a second dipole mode excitation configuration having a negative forty-five degree orientation, a third dipole mode excitation configuration having a zero degree orientation, and a fourth dipole mode excitation configuration having a positive ninety degree orientation.

13. The downhole acoustic tool of claim 12, wherein the four or more transmitters of the transmitter sub-section include a first transmitter positioned in a first quadrant of the transmitter section, a second transmitter positioned in a second quadrant of the transmitter section neighboring the first quadrant, a third transmitter positioned in a third quadrant of the transmitter section neighboring the second quadrant, and a fourth transmitter positioned in a fourth quadrant of the transmitter section neighboring the third quadrant and the first quadrant.

14. The downhole acoustic tool of claim 13, wherein the first dipole mode excitation configuration includes electrically driving the first and second transmitters with positive power while electrically driving the third and fourth transmitters with negative power, wherein the second dipole mode excitation configuration includes electrically driving the first and fourth transmitters with positive power while electrically driving the second and third transmitters with negative power, wherein the third dipole mode excitation configuration includes electrically driving the first transmitter with positive power while driving the third transmitter with negative power, while the second and fourth transmitters are unpowered, and wherein the fourth dipole mode excitation configuration includes electrically driving the second transmitter with positive power while driving the fourth transmitter with negative power, while the first and third transmitters are unpowered.

15. A method for measuring a formation using a downhole acoustic tool, comprising:
providing the acoustic tool with a transmitter section including a transmitter sub-section, the transmitter sub-section including four or more transmitters respectively positioned at a common axial plane of the acoustic tool, respective ones of the four or more transmitters being selectively electrically drivable so as to excite multi-mode waveforms, the transmitter sub-section being selectively operable in multiple excitation modes including a unipole mode, a monopole mode, a dipole mode, and a quadrupole mode;
providing the acoustic tool with a receiver section including a receiver sub-section spaced axially apart from the transmitter sub-section, the receiver sub-section including four or more receivers axially aligned with the four or more transmitters;
selectively operating the transmitter sub-section in the multiple excitation modes by selectively electrically driving respective ones of the four or more transmitters of the transmitter sub-section to excite the multi-mode waveforms;
receiving the multi-mode waveforms at the receiver sub-section; and
processing the multi-mode waveforms received at the receiver sub-section to interpret formation characteristics.

16. The method of claim 15, wherein the four or more transmitters are four quadrant transmitters, and the four or more receivers are four corresponding azimuthal channels.

17. The method of claim 15, further including controlling firing of the four or more transmitters at a desired azimuthal orientation in a borehole.

18. The method of claim 15, wherein the receiver section further includes an additional receiver sub-section spaced axially apart from the transmitter sub-section, the additional receiver sub-section including an additional four or more receivers axially aligned with the four or more transmitters.

19. The method of claim 15, wherein the dipole mode includes a first dipole mode excitation configuration having a positive forty-five degree orientation, a second dipole mode excitation configuration having a negative forty-five degree orientation, a third dipole mode excitation configuration having a zero degree orientation, and a fourth dipole mode excitation configuration having a positive ninety degree orientation.

20. The method of claim 19, wherein the four or more transmitters of the transmitter sub-section include a first transmitter positioned in a first quadrant of the transmitter section, a second transmitter positioned in a second quadrant of the transmitter section neighboring the first quadrant, a third transmitter positioned in a third quadrant of the transmitter section neighboring the second quadrant, and a fourth transmitter positioned in a fourth quadrant of the transmitter section neighboring the third quadrant the first quadrant.

21. The method of claim 20, wherein the first dipole mode excitation configuration includes electrically driving the first and second transmitters with positive power while electrically driving the third and fourth transmitters with negative power, wherein the second dipole mode excitation configuration includes electrically driving the first and fourth transmitters with positive power while electrically driving the second and third transmitters with negative power, wherein the third dipole mode excitation configuration includes electrically driving the first transmitter with positive power while driving the third transmitter with negative power, while the second and fourth transmitters are unpowered, and wherein the fourth dipole mode excitation configuration includes electrically driving the second transmitter with positive power while driving the fourth transmitter with negative power, while the first and third transmitters are unpowered.

22. A downhole acoustic tool, comprising:
an acoustic tool body;
a transmitter section located along the acoustic tool body, the transmitter section including a transmitter sub-section, the transmitter sub-section including four or more transmitters respectively positioned at a common axial plane of the acoustic tool body, respective ones of the four or more transmitters being selectively electrically drivable so as to excite multi-mode waveforms;
a receiver section located along the acoustic tool body, the receiver section including a receiver sub-section spaced axially apart from the transmitter sub-section, the receiver sub-section including four or more receivers axially aligned with the four or more transmitters; and
a processor configured to:
- selectively operate the transmitter sub-section in multiple excitation modes by selectively electrically driving respective ones of the four or more transmitters of the transmitter sub-section to excite different ones of the multi-mode waveforms, wherein the multiple excitation modes include a unipole mode, a monopole mode, a dipole mode, and a quadrupole mode; and
- extract the multi-mode waveforms detected by the receiver sub-section for interpretation of formation properties.

\* \* \* \* \*